United States Patent
Gustavsson

(10) Patent No.: US 6,260,650 B1
(45) Date of Patent: Jul. 17, 2001

(54) APPARATUS AND METHOD FOR INDUCING SEAT BELT USAGE BY THE DRIVER OF A VEHICLE

(75) Inventor: Thomas Gustavsson, Frillesås (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 09/535,098

(22) Filed: Mar. 24, 2000

(51) Int. Cl.[7] ................................................ B60R 21/00
(52) U.S. Cl. ........................ 180/270; 180/268; 180/271
(58) Field of Search ................................ 180/268, 270, 180/271, 273

(56) References Cited

U.S. PATENT DOCUMENTS

| | | | |
|---|---|---|---|
| 3,757,293 | * | 9/1973 | Petersen, III ........................ 340/52 E |
| 3,784,972 | * | 1/1974 | Hults ................................... 340/52 E |
| 3,787,804 | * | 1/1974 | MacDonald ......................... 340/52 E |
| 3,815,086 | * | 6/1974 | Minton et al. ...................... 340/52 E |
| 3,831,140 | * | 8/1974 | Anderson, Jr. et al. ............ 340/53 E |
| 3,860,904 | * | 1/1975 | Andersen ............................ 340/52 E |
| 3,866,167 | * | 2/1975 | Hirano ................................ 340/52 E |
| 3,935,470 | * | 1/1976 | Cake ................................... 307/105 B |
| 4,319,658 | * | 3/1982 | Collonia et al. ..................... 180/271 |
| 5,394,955 | | 3/1995 | Howard ................................ 180/273 |
| 5,404,128 | * | 4/1995 | Ogino et al. ....................... 340/425.5 |
| 5,610,814 | * | 3/1997 | Sugioka et al. ................ 364/424.026 |
| 5,656,994 | | 8/1997 | Heninger ............................. 180/273 |
| 5,690,186 | * | 11/1997 | Sugioka et al. ..................... 180/273 |

* cited by examiner

Primary Examiner—Eric Culbreth
Assistant Examiner—L. Lum
(74) Attorney, Agent, or Firm—Kilpatrick Stockton LLP

(57) ABSTRACT

An apparatus for inducing seat belt usage by the driver of a vehicle, said apparatus comprising:

a seat belt, said seat belt carrying a seat belt buckle, a latching clasp for releasable engagement of said buckle and a presence detector for acknowledging when said buckle is engaged in said latching clasp.

12 Claims, 1 Drawing Sheet

APPARATUS AND METHOD FOR INDUCING SEAT BELT USAGE BY THE DRIVER OF A VEHICLE

TECHNICAL FIELD OF THE INVENTION

The present invention relates to an apparatus for inducing seat belt usage by the driver of a vehicle, said apparatus comprising: a seat belt, said seat belt carrying a seat belt buckle, a latching clasp for releasable engagement of said buckle and a presence detector for acknowledging when said buckle is engaged in said latching clasp. The invention further relates to an apparatus for inducing seat belt usage, wherein, if the seat belt is used a higher maximum velocity is allowed in comparison to if the seat belt is not used.

The invention also relates to a method for inducing seat belt usage by the driver of a vehicle wherein the presence of a seat belt buckle in a latching clasp for releasable engagement of said buckle is detected by a presence detector for acknowledging when said buckle is engaged in said latching clasp. The invention further relates to a method for inducing seat belt usage, wherein, if the seat belt is used a higher maximum velocity is allowed in comparison to if the seat belt is not used.

BACKGROUND OF THE INVENTION

Different incentives for inducing seat belt usage by drivers or vehicle occupants are known, for instance by legislation or by mounting of indicators for giving notice to vehicle occupants that they should wear a seat belt. These known types of incentives have not proven to be sufficiently efficient to encourage all drivers to use seat belts while driving.

A further suggestion for an apparatus and a method for inducing a vehicle occupant to use a seat belt is disclosed in U.S. Pat. No. 5,394,955 to Howard. The Howard patent discloses an apparatus and a method where power to Occupant Comfort Units is disconnected if a person is present in a seat and is not wearing a seat belt. An Occupant Comfort Unit includes such facilities as stereo, radio, cigarette lighters, electrically controlled heating or air conditioning. However, the Howard patent apparatus is most efficient when the vehicle is standing still, since this is when Occupant Comfort Units are most commonly set and appreciated. The fact that the incentive system of the Howard patent forces the occupant to use the seat belt before driving creates an opportunity to tamper with the system.

SUMMARY OF THE INVENTION

The object of the invention is to provide an apparatus and a method for inducing a driver to use a seat belt, where the incentive occurs while driving. The invention allows the vehicle to operate at higher speeds when the driver has engaged the seat belt than when the seat belt is not engaged.

This object is achieved by an apparatus for inducing seat belt usage by the driver of a vehicle according to claim 1 or a method for inducing seat belt usage by the driver of a vehicle according to claim 6.

The invention is achieved by providing an apparatus or a method for inducing seat belt usage by the driver of a vehicle having a vehicle control unit arranged to operate said vehicle in a first mode if the presence detector has indicated that the buckle is engaged and in a second mode if the presence detector has indicated that the buckle is not engaged and wherein, in said first mode the maximum speed of the vehicle is higher than in said second mode, and thereby the driver is induced to use the seat belt to achieve maximum velocity output of the vehicle. Particularly for truck drivers, this also coincides with maximum benefits of using a seat belt.

In preferred embodiments of the invention as claimed in the dependent claims, the increment in maximum allowed speed obtainable for the driver when belted is small. The performance of the vehicle is not severely affected by not using the belt, thereby avoiding accidents, which could occur if the vehicle would respond in an unknown manner. However, since a driver is normally paid by miles driven each day, and since mileage driven within a set time period is a function of speed, and mileage is dependant upon speed the driver would have an incentive for using the belt. Thus the invention creates a strong incentive to use the belt while driving.

DETAILED DESCRIPTION OF THE INVENTION

Figure 1:
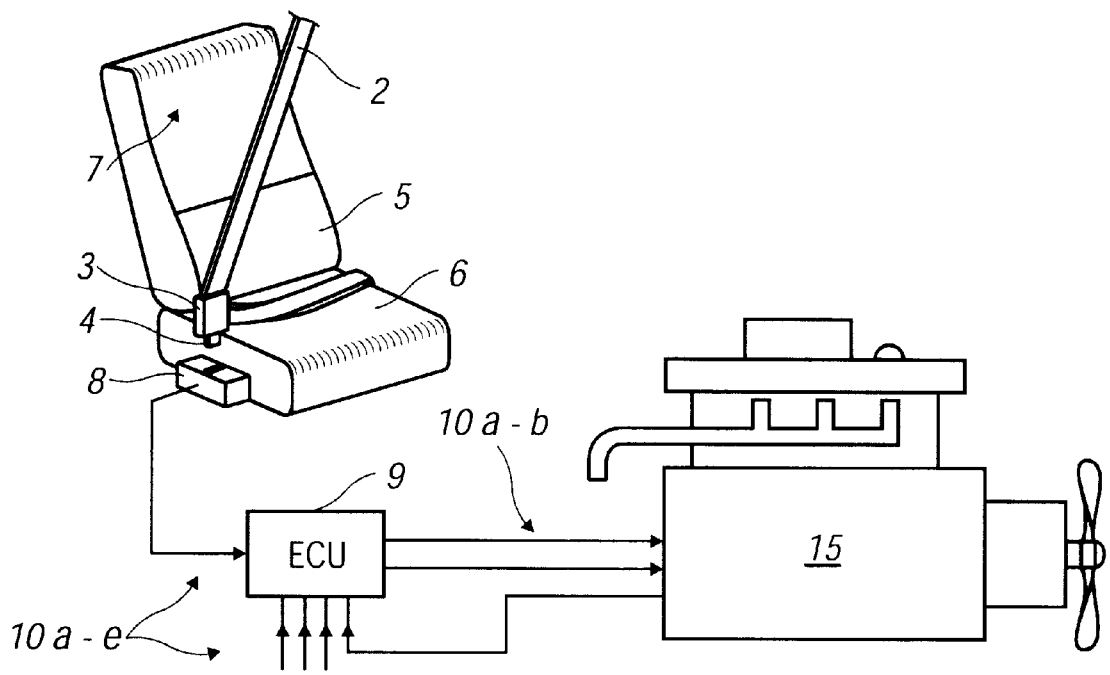
FIG. 1 schematically illustrates an embodiment of the invention.

FIG. 1 shows an apparatus 1 for inducing seat belt usage by the driver of a vehicle. The apparatus 1 includes a seat belt 2, a seat belt buckle 3 mounted on the belt 2 and a latching clasp 4 for releasable engagement of said buckle. The belt is mounted in any known fashion in connection with a seat 5, having a seat portion 6 and a backrest 7. The belt can thus either be arranged integrally with the seat 5 or be mounted to frame structure (not shown) of the vehicle.

A presence detector 8 for acknowledging when said buckle is engaged in said latching clasp is arranged in connection with the buckle 3 or the clasp 4. Normally an electrical switch mounted in the clasp would be used, but several detectors are known in the art and the skilled person in the art could choose any type of indicator serving the purpose of a presence detector for acknowledging that the buckle is engaged.

The presence detector 8 is communicating with a vehicle control unit 9 for controlling the delivered power of the engine and the speed of the vehicle. The vehicle control unit includes various input channels 10a–e and various output channels 11a–b, the input channels include information about vehicle speed, belt on or off condition, rpm, selected gear, cooling water temperature etc and the output channels includes information about fuel injection, ignition timing etc. The control unit is known in the art and will therefore not be described in detail. In a preferred embodiment the vehicle control unit is selected to be the engine control unit, since it effects velocity control which is a normal parameter for an engine control unit to operate. If the engine control unit is selected for performing the function according to the invention of the vehicle control unit, the engine control unit would be arranged to operate said engine in a first mode if the presence detector has indicated that the buckle is engaged and in a second mode if the presence detector has indicated that the buckle is not engaged and wherein, in said first mode the maximum speed of the vehicle is higher than in said second mode.

The vehicle control unit 9 include a possibility of limiting the maximum velocity of the vehicle. For this reason, a field or an array containing information about the maximum velocity is implemented in the vehicle control unit 9. The vehicle control unit 9 controls an engine 15 in a manner known to a person skilled in the art.

The seat furthermore could be equipped with an occupant presence indicator (not shown). Such indicator registers the presence of an occupant, or rather an object having a certain weight, on the seat. A presence detector in the form of a camera could also verify the presence of a person on a seat. When the presence indicator or detector indicates that a person occupies the seat a further step must be taken to verify that the occupant is using the seatbelt. In a first embodiment of the invention the presence detector 8 could be used without any assistance by other means.

However, a person could arrange the seatbelt behind his back to dupe the system to believe that the belt is used. For this reason the system is provided with means for verifying that the occupant is using the seatbelt. The means for verifying could be arranged as an indicator sensing that the belt is attached and that the belt is pulled out to more than a certain degree, which would correspond to a belt attached behind the back of an occupant. According to a second embodiment a sensor could be provided which senses a fluctuation of the length of the belt which is pulled out. The movement of an occupant using a belt results in such fluctuation. According to a third embodiment an optical sensor could verify that the occupant is using the belt. The means for verifying could be arranged by these embodiments separately or in combination.

According to the invention the vehicle is arranged to operate at a first driving condition if the presence detector has indicated that the buckle is engaged and at a second driving condition if the presence indicator has indicated that the buckle is not engaged.

In one embodiment of the invention the first and second driving conditions has different allowed maximum vehicle speed. In another embodiment of the invention the first and second driving conditions has different allowed maximum engine power output.

Figure 2:
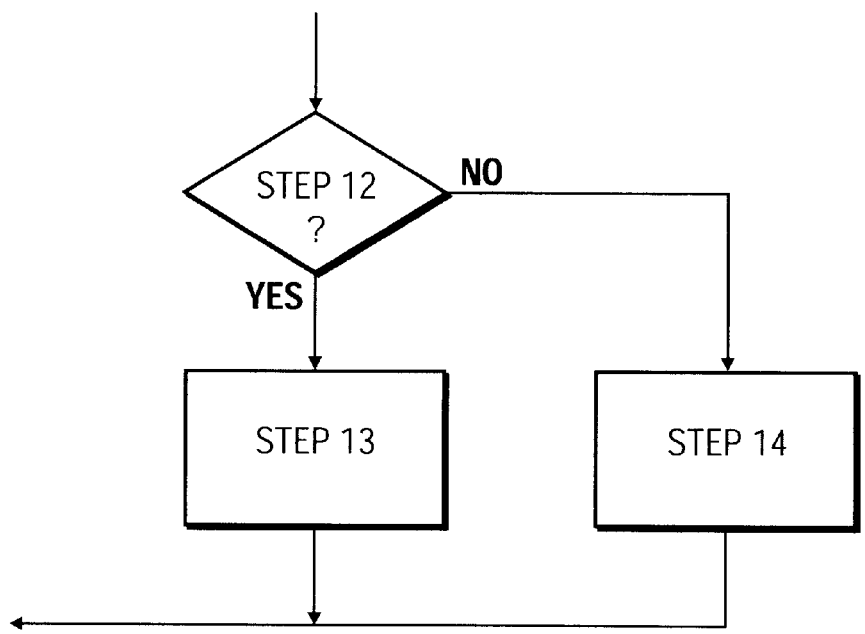
FIG. 2 is a flow digram of the control unit.

FIG. 2 shows how the parameter "maximum velocity" is set by the control unit. In a first step 12 information from the detector 8 is used to check whether the belt is used or not. If the belt is not used, the process is continued at step 14 where the parameter "maximum velocity" is set to M2. When the parameter maximum speed is set, the ECU leaves short loop for returning later according to a predetermined running schedule of different algorithms in the electronic control unit.

The engine 15 is thereby operated in a first mode M1 if the presence detector 8 has indicated that the buckle is engaged and in a second mode M2 if the presence detector 8 has indicated that the buckle is not engaged. The parameter "maximum velocity" M1 and M2 are set so that in said first mode the maximum speed of the vehicle is higher than in said second mode.

In preferred embodiments of the invention M2 is more than 75% of M1, in another preferred embodiment M2 is more than 90% of M1.

In other preferred embodiments of the invention, the difference between M1 and M2 is less than 20 mph, in a still more preferred embodiment the difference between M1 and M2 is less than 5 mph. In another preferred embodiment the difference between M1 and M2 is less than 3 mph.

In an alternative embodiment of the invention, the maximum speed set for the vehicle when wearing the seat belt is related to maximum engine output power and is not set to a specific velocity. In this case M2 is set with reference to an expected value of M1.

In a still further embodiment of the invention a parameter "maximum engine output power" is set by the control unit.

In a first step 12 information from the detector 8 is used to check whether the belt is used or not. If the belt is used, the process is continued at a second step 13 where the parameter "maximum engine output power" is set to M3. If the belt is not used, the process is continued at step 14 where the parameter "maximum engine output power" is set to M4. When the parameter maximum engine output power is set, the ECU leaves short loop for returning later according to a predetermined running schedule of different algorithms in the electronic control unit.

The engine 15 is thereby operated in a first mode M3 if the presence detector 8 has indicated that the buckle is engaged and in a second mode M4 if the presence detector 8 has indicated that the buckle is not engaged. The parameter "maximum engine output power" M3 and M4 are set so that in said first mode the maximum speed of the vehicle is higher than in said second mode.

In preferred embodiments of the invention M4 is more than 75% of M3, in a still preferred embodiment M4 is more than 90% of M3.

What is claimed is:

1. An apparatus for inducing seatbelt usage by a driver of a vehicle including an engine, said apparatus comprising:
   a seat belt, said seat belt carrying a seat belt buckle;
   a latching clasp for releasable engagement of said seat belt buckle;
   a presence detector for acknowledging when said seat belt buckle is engaged in said latching clasp; and
   a vehicle control unit for controlling engine output power and speed of the vehicle,
      wherein said vehicle control unit is arranged to operate said vehicle in a first mode, if the presence detector has indicated that said seat belt buckle is engaged in said latching clasp,
      and in a second mode if the presence detector has indicated that said seat belt buckle is not engaged in said latching clasp,
      wherein in the first mode the speed of the vehicle is higher than an idle speed, and,
      wherein maximum speed of the second mode is more than 75% of maximum speed of the first mode.

2. An apparatus according to claim 1 wherein the maximum speed of the second mode is more than 90% of the maximum speed of the first mode.

3. An apparatus for inducing seatbelt usage by a driver of a vehicle including an engine, said apparatus comprising:
   a seat belt, said seat belt carrying a seat belt buckle;
   a latching clasp for releasable engagement of said seat belt buckle;
   a presence detector for acknowledging when said seat belt buckle is engaged in said latching clasp; and
   a vehicle control unit for controlling engine output power and speed of the vehicle,
      wherein said vehicle control unit is arranged to operate said vehicle in a first mode, if the presence detector has indicated that said seat belt buckle is engaged in said latching clasp,
      and in a second mode if the presence detector has indicated that said seat belt buckle is not engaged in said latching clasp,
      wherein in the first mode, the speed of the vehicle is higher than an idle speed, and,
      wherein a difference between maximum speeds of the first and second modes is less than 20 mph.

4. An apparatus according to claim 3 wherein the difference between the maximum speeds of the first and second modes is less than 5 mph.

5. An apparatus for inducing seatbelt usage by a driver of a vehicle including an engine, said apparatus comprising:
- a seat belt, said seat belt carrying a seat belt buckle;
- a latching clasp for releasable engagement of said seat belt buckle;
- a presence detector for acknowledging when said seat belt buckle is engaged in said latching clasp; and
- a vehicle control unit for controlling engine output power and speed of the vehicle,
  - wherein said vehicle control unit is arranged to operate said vehicle in a first mode, if the presence detector has indicated that said seat belt buckle is engaged in said latching clasp,
  - and in a second mode if the presence detector has indicated that said seat belt buckle is not engaged in said latching clasp,
  - wherein in the first mode, the speed of the vehicle is higher than an idle speed, and,
  - wherein maximum engine power output of the second mode is more than 75% of maximum engine power output of the first mode.

6. An apparatus according to claim 5 wherein maximum engine power output of the second mode is more than 90% of maximum engine power output of the first mode.

7. A method for inducing seat belt usage by a driver of a vehicle, said method including the steps of:
- detecting the presence of a seat belt buckle in a latching clasp for releasable engagement of said seat belt by a presence detector for acknowledging when said seat belt buckle is engaged in said latching clasp;
- transmitting a signal from said presence detector to a vehicle control unit for controlling-engine output power and speed of the vehicle; and
- arranging said vehicle control unit to operate said vehicle in a first mode if the presence detector has indicated that said seat belt buckle is engaged in said latching clasp,
  - and in a second mode if the presence detector has indicated that said seat belt buckle is not engaged in said latching clasp,
  - wherein in the first mode, the speed of the vehicle is higher than an idle speed, and
  - wherein maximum speed of the second mode is more than 75% of maximum speed of the first mode.

8. A method according to claim 7 wherein the maximum speed of the second mode is more than 90% of the maximum speed of the first mode.

9. A method for inducing seat belt usage by a driver of a vehicle, said method including the steps of:
- detecting the presence of a seat belt buckle in a latching clasp for releasable engagement of said seat belt by a presence detector for acknowledging when said seat belt buckle is engaged in said latching clasp;
- transmitting a signal from said presence detector to a vehicle control unit for controlling engine output power and speed of the vehicle; and
- arranging said vehicle control unit to operate said vehicle in a first mode if the presence detector has indicated that said seat belt buckle is engaged in said latching clasp,
  - and in a second mode if the presence detector has indicated that said seat belt buckle is not engaged in said latching clasp,
  - wherein in the first mode, the speed of the vehicle is higher than an idle speed, and,
  - wherein a difference between maximum speeds of the first and second modes is less than 20 mph.

10. A method according to claim 9 wherein the difference between the maximum speeds of the first and second modes is less than 5 mph.

11. A method for inducing seat belt usage by a driver of a vehicle, said method including the steps of:
- detecting the presence of a seat belt buckle in a latching clasp for releasable engagement of said seat belt by a presence detector for acknowledging when said seat belt buckle is engaged in said latching clasp;
- transmitting a signal from said presence detector to a vehicle control unit for controlling engine output power and speed of the vehicle; and
- arranging said vehicle control unit to operate said vehicle in a first mode if the presence detector has indicated that said seat belt buckle is engaged in said latching clasp,
  - and in a second mode if the presence detector has indicated that said seat belt buckle is not engaged in said latching clasp,
  - wherein in the first mode, the speed of the vehicle is higher than an idle speed, and,
  - wherein maximum engine power output of the second mode is more than 75% of maximum engine power output of the first mode.

12. A method according to claim 11 wherein maximum engine power output of the second mode is more than 90% of maximum engine power output of the first mode.

\* \* \* \* \*